Nov. 13, 1934.　　　　C. C. FARMER　　　1,980,328
LOAD BRAKE DEVICE
Filed May 2, 1933
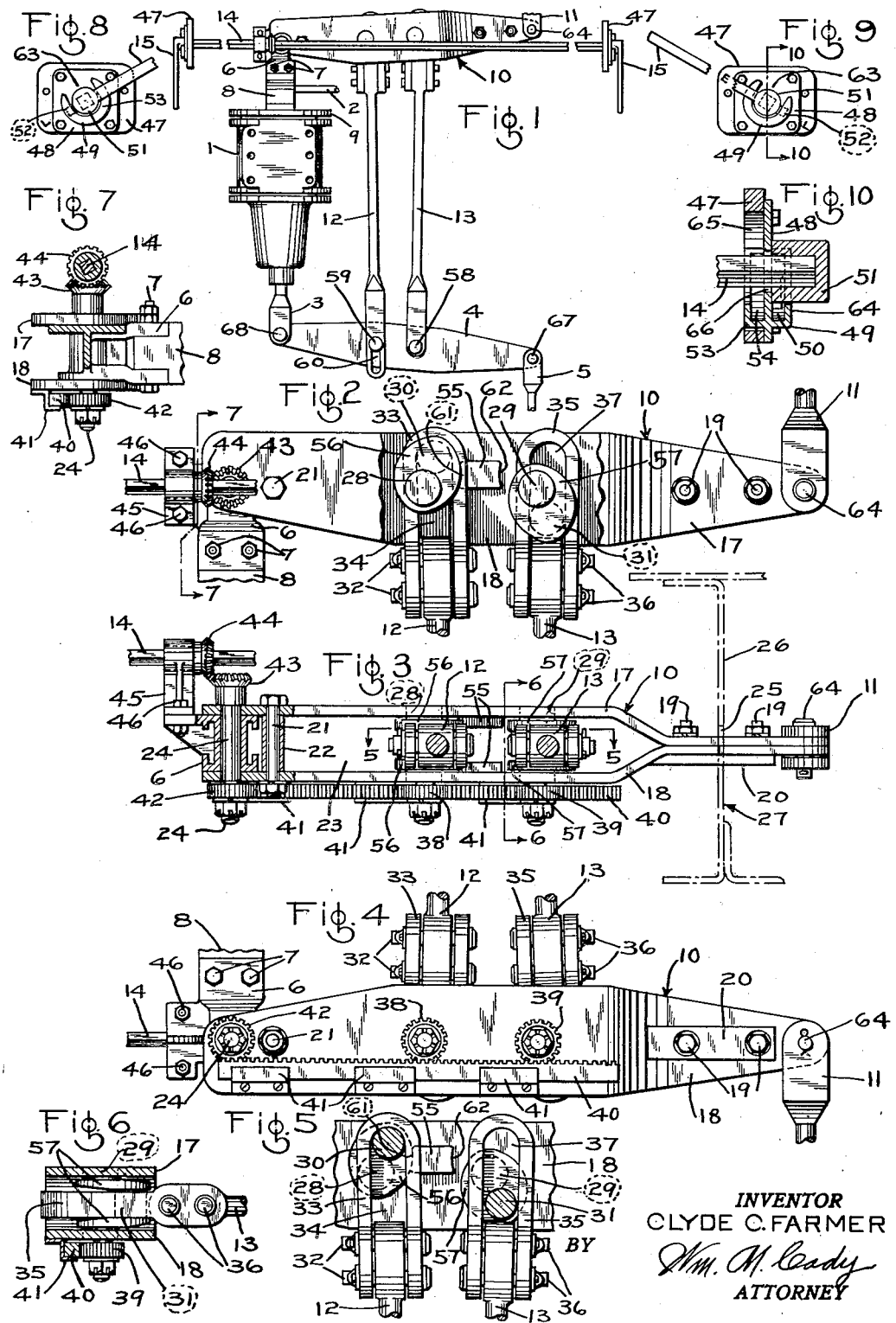
INVENTOR
CLYDE C. FARMER
BY
Wm. M. Cady
ATTORNEY Patented Nov. 13, 1934

1,980,328

UNITED STATES PATENT OFFICE 1,980,328

LOAD BRAKE DEVICE

Clyde C. Farmer, Pittsburgh, Pa., assignor to The Westinghouse Air Brake Company, Wilmerding, Pa., a corporation of Pennsylvania Application May 2, 1933, Serial No. 668,943

4 Claims. (Cl. 188—195)

This invention relates to fluid pressure brakes and more particularly to an empty and load brake apparatus.

The principal object of my invention is to provide an improved and simplified empty and load brake apparatus in which a single brake cylinder is associated with an auxiliary reservoir and a triple valve device of the type in common use, and in which the braking force may be adjusted, according as the car is empty or loaded, by shifting the fulcrum of the brake cylinder levers so as to provide a higher leverage ratio for a loaded car than for an empty car and still maintain substantially the same piston travel whether the fulcrum is adjusted for an empty car or for a loaded car, so as to maintain substantially the usual relationship between the pressure obtained in the brake cylinder and the reduction in brake pipe pressure. In the present embodiment of my invention, said fulcrum is adapted to be shifted by manually operated means operative from the side of the car.

Other objects and advantages will appear in the following more detailed description of my invention.

In the accompanying drawing: Fig. 1 is a plan view of a brake cylinder and a portion of the connected brake rigging, having my invention applied thereto; Fig. 2 is a plan view of the dead cylinder lever and the ends of the tie rods which are adapted to be operatively connected to said lever, with a portion of the lever broken away to show the crank-shafts for operatively connecting one or the other of the tie rods to said lever, the left-hand crank-shaft being positioned so as to operatively connect the corresponding tie rod to said lever to provide for empty car braking and the right-hand crank-shaft being positioned so that the corresponding tie rod is operatively disconnected from said lever; Fig. 3 is a side elevational view of the dead cylinder lever, showing the end of the tie rods and the rack and pinion arrangement for rotatively positioning the crank-shafts, said crank-shafts being shown adjusted for empty car braking; Fig. 4 is an inverted plan view of the dead cylinder lever, showing an inverted plan view of the rack and pinion arrangement for positioning the crank-shafts; Fig. 5 is a sectional view taken on the line 5—5 of Fig. 3; Fig. 6 is a sectional view taken on the line 6—6 of Fig. 3; Fig. 7 is a sectional view taken on the line 7—7 of Fig. 2; Fig. 8 is a face view of a plate disposed at one side of the car and carrying an operating handle; Fig. 9 is a similar view of the plate disposed at the opposite side of the car and carrying an operating handle; and Fig. 10 is a sectional view taken on the line 10—10 of Fig. 9.

As shown in the drawing, the fluid pressure brake equipment comprises the usual brake cylinder 1 to which fluid under pressure is adapted to be supplied and from which fluid under pressure is adapted to be released through the pipe 2, in the usual well known manner.

Associated with the brake cylinder 1 is the usual push-rod 3, the outer end of which is operatively connected, by means of the pin 68, to one end of a live cylinder lever 4, the other end of said lever being operatively connected to the usual pull-rod 5 by means of the pin 67. Pivotally mounted on a bracket 6 secured, by means of the bolts 7, to a lug 8 extending rearwardly from the pressure head 9 of the brake cylinder, is a dead cylinder lever 10, the other end of said lever being operatively connected to the usual pull-rod 11, by means of the pin 64.

For operatively connecting the cylinder levers 4 and 10, the tie rods 12 and 13 are provided which are effective, one at a time, as desired, to operatively connect said levers. The tie rod 12 is adapted to be effective when it is desired to provide a relatively low leverage ratio, as for an empty car, and the tie rod 13 is adapted to be effective when it is desired to provide a higher leverage ratio, as for a loaded car. For selectively rendering one or the other of said tie rods effective, a mechanism is provided which comprises a rod 14 extending from one side of the car to the other and having at each end an operating handle 15.

The dead cylinder lever 10 comprises an upper member 17 and a lower member 18 which are secured together at one end by means of the bolts 19, and which may be operatively connected at said end to the pull-rod 11. Adjacent said end, the members 17 and 18 are so shaped that they diverge for a portion of their length, beyond which portion they extend substantially parallel, being secured together at the other end by means of a bolt 21 which clamps said members to a sleeve 22 which is mounted on said bolt intermediate said members. Thus, the members 17 and 18 are spaced apart for a portion of their length, forming an opening 23, for a purpose to be explained hereinafter.

The left-hand end of the dead cylinder lever 10 is pivotally mounted on the aforementioned bracket 6 through the medium of a shaft 24 which extends through both the members 17 and 18 and through said bracket and which is free to rotate relative thereto.

The right-hand end of the dead cylinder lever 10 may be supported, as shown in Fig. 3, within an opening 25 in the vertical web 26 of a channel-shaped member 27 which forms a part of the usual center sill of a railway car, a wearing plate 20, carried by the member 18, being in sliding engagement with the lower edge of said opening.

Rotatably carried by the members 17 and 18 are the crank-shafts 28 and 29, the respective crank-pins 30 and 31 being disposed within the aforementioned opening 23, and the crank-shaft 28 being disposed closer to the pivot shaft 24 than is the crank-shaft 29.

Secured to the end of the tie rod 12, by means of the bolts 32, is a substantially U-shaped member 33, the crank-pin 30 being disposed within the longitudinally elongated opening 34 within said member. A substantially U-shaped member 35 is also secured to the tie rod 13 by means of the bolts 36, the crank-pin 31 being disposed within the longitudinally elongated opening 37 within said member.

Secured to the lower end of the crank-shafts 28 and 29 are the pinions 38 and 39, respectively, which mesh with the teeth formed on a rack-bar 40, which is slidably carried by the brackets 41 mounted on the underside of the member 18. The teeth on said rack-bar also mesh with the teeth on a pinion 42 fixed to the lower end of the aforementioned shaft 24, the upper end of said shaft having fixed thereto a bevel gear 43.

For causing rotation of the shaft 24 and the consequent movement of the rack-bar 40 and rotation of the pinions 38 and 39 for positioning the respective crank-shafts 28 and 29, a bevel gear 44 is provided which meshes with the bevel gear 43 and which may be rotatably carried by a bracket 45 secured to the bracket 6 by means of the bolts 46. For rotating the bevel gear 44 the aforementioned rod 14 is provided, which extends from one side of the car to the other and which is adapted to be manually operated, as will be understood from the description hereinafter. Said rod is preferably square in cross-section and engages the bevel gear 44 within a square opening in said gear.

Each end of the rod 14 extends through an opening 65 in an escutcheon plate 47 secured to each side of the car and through an opening 66 in a plate 48 secured to each escutcheon plate, said plate 48 being provided on its outer face with a boss 49 partially surrounding said opening and having an inwardly extending flange 64, there being a groove 50 formed between said flange and the face of said plate.

For rotating the rod 14, a handle 15, hereinbefore mentioned, is mounted on each end of said rod, said handle having a socket portion 51 which engages the squared shaft within a square opening in said socket portion. Extending outwardly from the socket portion is a tongue 52 which loosely engages the boss 49 within the groove 50, for a purpose which will be described hereinafter.

The plate 48 is provided on the reverse side with a flanged boss 53 similar to the boss 49 and with a groove 54 similar to the groove 50, so positioned that said plate, reversed in position, may be used at the opposite side of the car, with the tongue 52 of the handle 15 loosely engaging the boss 53 within the groove 54. The bosses 49 and 53 are provided with an opening 63 for a purpose which will be explained hereinafter.

For defining the effective position of the crank-pins 30 and 31 and for preventing any strain on the operating mechanism which would otherwise be caused by the pull exerted on either of the crank-pins by the respective tie rods 12 and 13 when said tie rods are in the brake applying position, oppositely disposed stop lugs 55, having the oppositely disposed faces 61 and 62, are provided on the inner faces of the members 17 and 18, in the path of rotation of the crank-arms 56 and 57, respectively, of the respective crank-shafts 28 and 29. The faces 61 are adapted to be engaged by the crank-arms 56 of the crank-shaft 28 when the mechanism is adjusted for empty car braking, and when so engaged, the crank-pin 30 is disposed in its effective position, where it is adapted to engage the member 33 at the outer end of the opening 34, and the crank-pin 31 is disposed in its ineffective position, as shown in the drawing. The faces 62 are adapted to be engaged by the crank-arms 57 of the crank-shaft 29 when the mechanism is adjusted for loaded car braking, and when so engaged, the crank-pin 31 is disposed in its effective position, where it is adapted to engage the member 35 at the outer end of the opening 37, and the crank-arm 56 is disposed in its ineffective position, as will be understood from the description hereinafter.

It will be noted that the effective position of the crank-pin 30 is beyond the dead center of said pin so as to positively prevent the crank-shaft 28 from turning from its adjusted position when the tie rod 12 is tensioned in effecting an application of the brakes. By providing the fixed stop lugs 55, the forces developed in applying the brakes are applied only to the crank-pin and to said stop, it being evident that due to this construction, braking forces are not applied to the gear mechanism.

Similarly, the crank-pin 31, when disposed in its effective position, is positioned beyond the dead center of said pin, so as to prevent the crank-shaft 29 from turning from its adjusted position when the tie rod 13 is tensioned in effecting an application of the brakes. Due to the engagement of the crank-arms 57 with the stop lugs 55 in the effective position of the crank-pin 31, the pull of the tie rod 13 in applying the brakes is applied only to the crank-pin and to said stop, and not to the gear mechanism.

The tie rod 13 is operatively connected to the live cylinder lever 4 by means of a fulcrum pin 58, and the tie rod 12 is adapted to be operatively connected to said lever by means of a fulcrum pin 59 carried by said lever and engaging the tie rod 12 within a longitudinally slotted opening 60 in said tie rod, the fulcrum pin 58 being disposed at a greater distance from the push rod pin 68 than is the fulcrum pin 59.

The lengths of the openings 60 and of the opening 37 within the member 35 are such that when the crank-pins 30 and 31 are in the positions shown in Figs. 2 and 5, for rendering the tie rod 12 effective and the tie rod 13 ineffective, and the cylinder lever 4 is rotated in an anti-clockwise direction about the pin 64 to the brake applying position, thereby causing the pin 59 to move outwardly so as to engage the tie rod 12 at the outer end of the slotted opening 60, there will still be some clearance between the crank-pin 31 and the end of the member 35 within the opening 37.

The apparatus may be installed by mounting the assembled dead cylinder lever 10 on the bracket 6, with the crank-pins 30 and 31 properly positioned with respect to each other, and then mounting the braket 45, carrying the bevel gear 44, on the bracket 6. The rod 14 is then inserted through the square opening in said gear, the ends of said rod extending through the openings 65 in the escutcheon plates 47 which are secured to the car body at each side of the car. With one of the handles 15 mounted on said rod, say at the end shown at the left hand in the drawing, the rod is turned by means of said handle in a clockwise direction until stopped by the engagement of the crank-arms 56 with the faces 61 of the stop lugs 55. The crank-pins 30 and 31 being thus positioned for empty car braking, and with both handles 15 positioned accordingly with respect to the escutcheon plate, the plates 48 are inserted between the respective plates 47 and the respective handles 15 in such a manner that the tongues 52 on said handles will enter the openings 63. Then the plates 48 are turned to their proper positions and secured to the plates 47, it being evident that upon thus positioning the plates 48, the tongues will freely enter the respective grooves 50 and 53. It will be understood that plates 48 are so positioned that the path of travel of the tongues 52 will be entirely within said respective grooves. Thus, the handles are protected against being jolted off the rod and being lost.

Assuming that the handles are positioned for empty car braking and that the crank-pin 30 is, therefore, in its effective position and the crank-pin 31 is in its ineffective position, as shown in Figs. 2 and 5, when fluid under pressure is supplied, in the usual manner, to the brake cylinder in effecting an application of the brakes, the push rod 3 is moved outwardly, causing the cylinder lever 4 to be freely rotated in an anti-clockwise direction about the fulcrum 67. This movement of said cylinder lever shifts the fulcrum pin 59 outwardly relative to the tie rod 12, until said pin engages said rod at the outer end of the opening 60, which operatively connects the cylinder lever 4 to the cylinder lever 10. After the cylinder levers are thus operatively connected, further outward movement of the push rod 3 operates to move the pull rods 5 and 11 toward each other, thereby taking up the slack in the brake rigging and applying the brake shoes against the car wheels, in the usual well known manner.

During the above mentioned movement of the cylinder lever 4, the tie rod 13 remains ineffective, as will now be explained. The fulcrum pin 58 is moved outward initially, until the fulcrum pin 59 has been moved to the outer end of the opening 60. During this movement of the pin 58, the tie rod 13 will move outward freely, relative to the crank-pin 31, due to the clearance between said pin and the outer end of the member 35 within the opening 37. When the fulcrum pin 59 engages the tie rod 12 at the lower end of the opening 60 and the cylinder lever 4 begins to rotate in an anti-clockwise direction about said pin, the pin 58 will be moved inwardly, and consequently the tie rod 13 will be moved inwardly freely relative to the crank-pin 31, due to the clearance between said crank-pin and the end of said tie rod within the opening 37.

When the apparatus is set for loaded car braking, by turning the handle 15 at the left-hand side of the car in an anticlockwise direction or by turning the handle 15 at the right-hand side of the car in a clockwise direction, the gear mechanism is operated so as to rotate the crank-pin 31 in an anti-clockwise direction until stopped by the engagement of the crank-arms 57 with the faces 62 of the stop lugs 55, thus positioning said crank-pin in its effective position, where it is adapted to engage the member 35 at the upper end of the opening 37. This movement of the gear mechanism also causes the crank-pin 30 to be moved in an anti-clockwise direction to its ineffective position.

Now, when the push-rod 3 is moved outwardly in effecting an application of the brakes, the tie rod 13 becomes substantially immediately effective, in the usual manner, for taking up the slack in the rigging and applying the brake shoes against the car wheels. The tie rod 12 remains ineffective because there is sufficient clearance between the pin 59 and the outer end of the slot 60, combined with the clearance between the crank-pin 30 and the end of the slot 34 within the member 33, to permit the pin 59 to move outwardly without causing the tie rod 12 to be moved a distance sufficient for the end of the member 33 to engage the crank-pin 30 within the opening 34.

Thus, it will be seen that when the apparatus is set for empty car braking, the tie rod 12 is effective after the brake cylinder push-rod has moved outwardly a predetermined distance in effecting an application of the brakes, as fixed by the length of the slot 60 in said tie rod, the tie rod 13 remaining ineffective during said application. Also, when the apparatus is adjusted for loaded car braking, the tie rod 13 becomes substantially immediately effective upon the outward movement of the brake cylinder push-rod in effecting an application of the brakes, the tie rod 12 remaining ineffective.

It will be noticed that, with a given amount of movement of the pins 67 and 64 for taking up the slack in the brake rigging and moving the brake shoes into engagement with the car wheels, the travel of the brake cylinder push-rod, as effected by the usual brake cylinder piston (not shown) is maintained substantially the same when the fulcrum pin 59 is effective as when the fulcrum pin 58 is effective, because the slotted opening 60 provides for a predetermined preliminary movement of the pin 59 before said pin becomes effective as a fulcrum, the amount of said preliminary movement being sufficient to compensate for the difference in the lever arms about the pins 58 and 59.

It is also evident that, as the fulcrum pin 58 is disposed at a greater distance from the push-rod 68 than is the fulcrum pin 59, the leverage ratio, when the pin 58 is effective as a fulcrum, is greater than when the pin 59 is effective as a fulcrum. In other words, with the pin 58 effective as a fulcrum, a greater pull is applied to the pull-rods 5 and 11, with a given pressure acting in the brake cylinder, than when the pin 59 is effective.

It will be seen from the foregoing that I have provided improved means for manually shifting the fulcrum point of a brake cylinder lever so as to provide a higher leverage ratio for a loaded car than for an empty car and at the same time maintain a substantially uniform brake cylinder piston travel.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a brake cylinder having a push-rod operated by fluid under pressure to supply braking power, a live cylinder lever connected to one end of said push-rod, and a brake applying member connected to said lever, of a fulcrum member, fulcrum means for the lever comprising a plurality of eccentric members rotatably carried by said fulcrum member, a plurality of tension members operatively connected to said eccentric members and to said cylinder lever at different fulcrum points, and means for rotatably positioning said eccentric members for selectively rendering said tension members effective, one at a time, to provide the fulcrum for said lever.

2. The combination with a brake cylinder having a push-rod operated by fluid under pressure to supply braking power, a live cylinder lever connected to one end of said push-rod, and a brake applying member connected to said lever, of a fulcrum member, fulcrum means for the lever comprising a plurality of eccentric members rotatably carried by said fulcrum member, a plurality of tension members operatively connected to said eccentric members and to said cylinder lever at different fulcrum points, means for rotatably positioning said eccentric members for selectively rendering said tension members effective, one at a time, to provide the fulcrum for said lever, and means for providing substantially the same movement of said push-rod and substantially the same movement of said brake applying member regardless of which tension member is effective.

3. The combination with a brake cylinder having a push-rod operated by fluid under pressure to supply braking power, a live cylinder lever connected to one end of said push-rod, and a brake applying member connected to said lever, of a fulcrum member, fulcrum means for said lever comprising a plurality of eccentric members rotatably carried by said fulcrum member, a plurality of tension members operatively connected to said eccentric members and to said cylinder lever at different fulcrum points, means for rotatably positioning said eccentric members for selectively rendering said tension members effective, one at a time, to provide the fulcrum for said lever, and means permitting a predetermined preliminary movement of the effective tension member before said tension member becomes effective.

4. The combination with a brake cylinder having a push-rod operated by fluid under pressure to supply braking power, a live cylinder lever connected to one end of said push-rod and having two fulcrum pins, and a brake applying member connected to said lever, of a fulcrum member, a pair of eccentric members rotatably carried by said fulcrum member, a tension rod operatively connected to one eccentric member and engaging one of said fulcrum pins within a longitudinally slotted opening in said tension rod, another tension rod operatively connected to the other of the pair of eccentric members and engaging said other fulcrum pin, said tension rods being operative, one at a time, to render one or the other of said fulcrum pins effective, said eccentric members having an effective position for rendering one or the other of said tie rods operative, a toothed gear mounted on each eccentric member and rotatable therewith, a toothed rack bar slidably carried by said fulcrum member and meshing with the teeth of said gears, a shaft rotatably carried by said fulcrum member, a toothed gear mounted on said shaft and rotatable therewith and meshing with the teeth of said rack bar, another gear mounted on said shaft and rotatable therewith, a gear meshing with the teeth of the last mentioned gear, a rod in driving engagement with the last mentioned gear, and means for manually rotating said rod.

CLYDE C. FARMER.